United States Patent
Hsu

(10) Patent No.: US 10,823,392 B1
(45) Date of Patent: Nov. 3, 2020

(54) MULTIFUNCTIONAL SOUND LAMP

(71) Applicant: Dong Guan Jia Sheng Lighting Technology Co., Ltd. China, Dong-Guna (CN)

(72) Inventor: Kevin Hsu, Taichung (TW)

(73) Assignee: Dong Guan Jia Sheng Lighting Technology Co., Ltd. China, Guang-Dong (CN)

( * ) Notice: Subject to any disclaimer, the term of this patent is extended or adjusted under 35 U.S.C. 154(b) by 0 days.

(21) Appl. No.: 16/731,202

(22) Filed: Dec. 31, 2019

(51) Int. Cl.
| H04R 1/02 | (2006.01) |
| H04R 9/06 | (2006.01) |
| F21V 33/00 | (2006.01) |
| F21V 23/04 | (2006.01) |
| H04R 3/00 | (2006.01) |
| G06F 3/16 | (2006.01) |
| H04R 1/34 | (2006.01) |

(52) U.S. Cl.
CPC .......... *F21V 33/0056* (2013.01); *F21V 23/04* (2013.01); *F21V 23/0435* (2013.01); *G06F 3/165* (2013.01); *H04R 1/028* (2013.01); *H04R 1/345* (2013.01); *H04R 3/00* (2013.01)

(58) Field of Classification Search
CPC .. F21V 33/0056; F21V 23/04; F21V 23/0435; G06F 3/165; H04R 1/028
See application file for complete search history.

(56) References Cited

U.S. PATENT DOCUMENTS

| 2002/0186129 A1* | 12/2002 | Rebello | G08B 21/182 340/540 |
| 2009/0324003 A1* | 12/2009 | Stewart, Jr. | H04R 1/026 381/391 |
| 2015/0366020 A1* | 12/2015 | Park | F21V 23/0442 362/234 |
| 2018/0334804 A1* | 11/2018 | Patterson | E04F 13/0801 |
| 2020/0167122 A1* | 5/2020 | Lee | G10K 9/13 |
| 2020/0213764 A1* | 7/2020 | Lee | H04R 1/028 |

\* cited by examiner

*Primary Examiner* — Simon King
(74) *Attorney, Agent, or Firm* — Alan D. Kamrath; Mayer & Williams PC

(57) ABSTRACT

A sound lamp includes a housing, an acoustics, and a lighting module. The housing includes a housing body and a top cover mounted on the housing body. A receiving space is defined between the housing body and the top cover. The housing body has a side provided with a plurality of sound output holes. The housing further includes a plurality of sound output reticulate boards mounted in the sound output holes, and a baffle mounted in the housing body and corresponding to the sound output holes. A guide channel is defined between the housing body and the baffle, and is connected to the sound output reticulate boards. The acoustics is mounted in the receiving space of the housing. The lighting module is mounted in the receiving space of the housing.

9 Claims, 5 Drawing Sheets

MULTIFUNCTIONAL SOUND LAMP

BACKGROUND OF THE INVENTION

1. Field of the Invention

The present invention relates to an illuminating apparatus and, more particularly, to a sound lamp.

2. Description of the Related Art

A conventional LED lamp is mounted in a kitchen, in a working place, on a table, on a cabinet, on a shelf or the like, to provide an illuminating effect. However, the conventional LED lamp only has a single function, and cannot provide a sounding effect, thereby decreasing the versatility and amusement thereof. Thus, the conventional LED lamp cannot satisfy diverse requirements of different users.

BRIEF SUMMARY OF THE INVENTION

The primary objective of the present invention is to provide a multifunctional sound lamp for a cabinet, cupboard, sideboard or the like.

In accordance with the present invention, there is provided a sound lamp comprising a housing, an acoustics mounted in the housing, and a lighting module mounted in the housing. The housing includes a housing body and a top cover mounted on the housing body. A receiving space is defined between the housing body and the top cover. The housing body has a side provided with a plurality of sound output holes. The housing further includes a plurality of sound output reticulate boards mounted in the sound output holes, and a baffle mounted in the housing body and corresponding to the sound output holes. A guide channel is defined between the housing body and the baffle, and is connected to the sound output reticulate boards. Each of the sound output reticulate boards has two mounting pieces provided on a top and a bottom thereof. A lower one of the two mounting pieces is secured to the baffle, and an upper one of the two mounting pieces is spaced from the baffle. The acoustics is mounted in the receiving space of the housing. The lighting module is mounted in the receiving space of the housing. The lighting module has a top flush with or lower than a top of the baffle.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
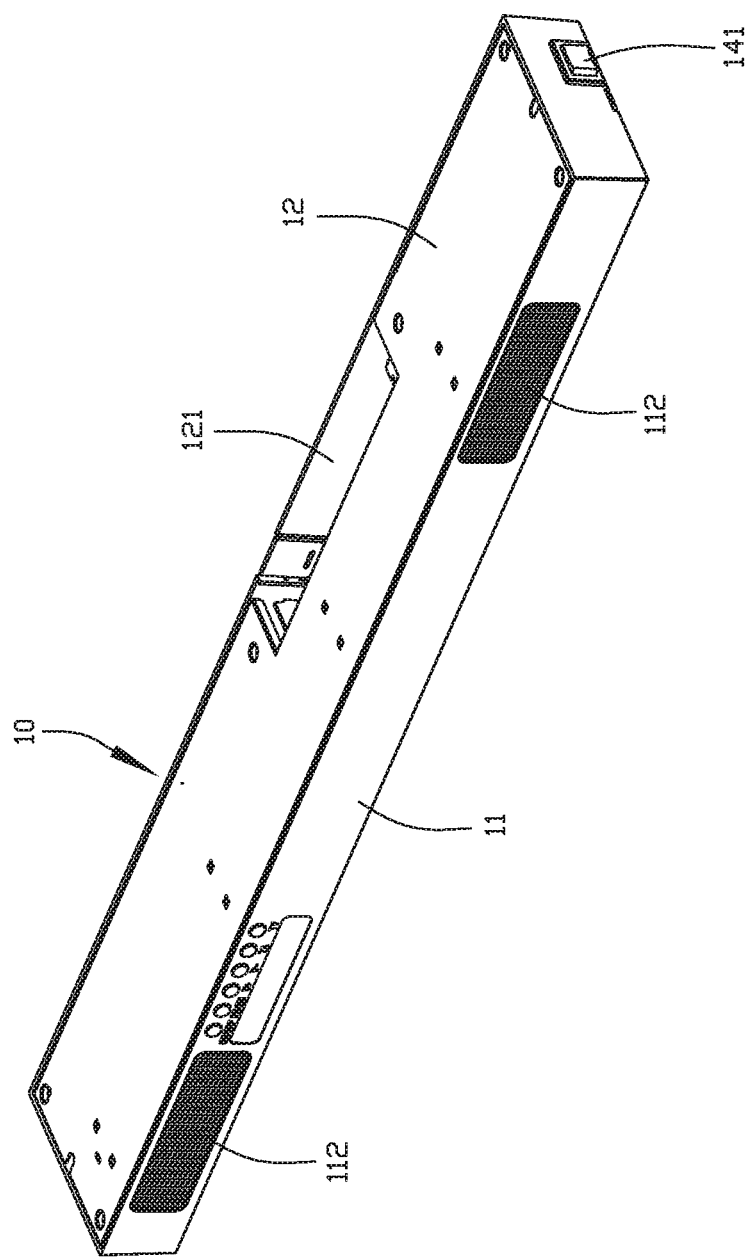
FIG. 1 is a perspective view of a sound lamp in accordance with the preferred embodiment of the present invention.
Figure 2:
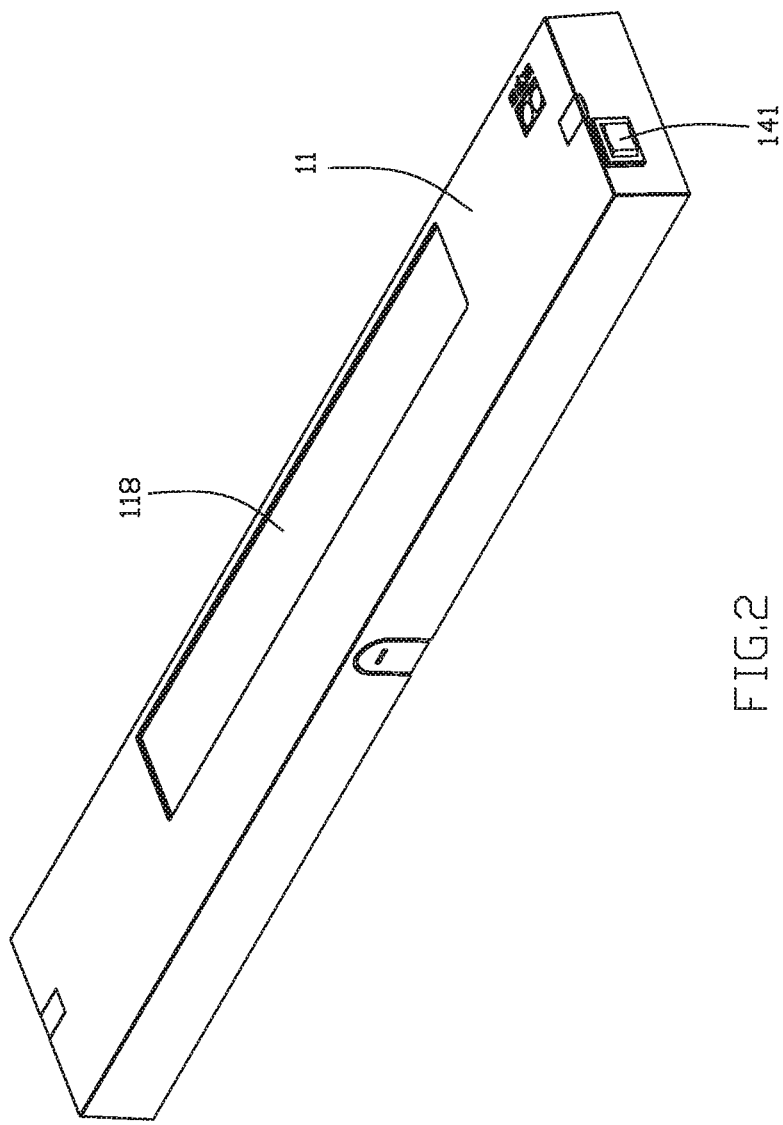
FIG. 2 is another perspective view of the sound lamp in accordance with the preferred embodiment of the present invention.
Figure 3:
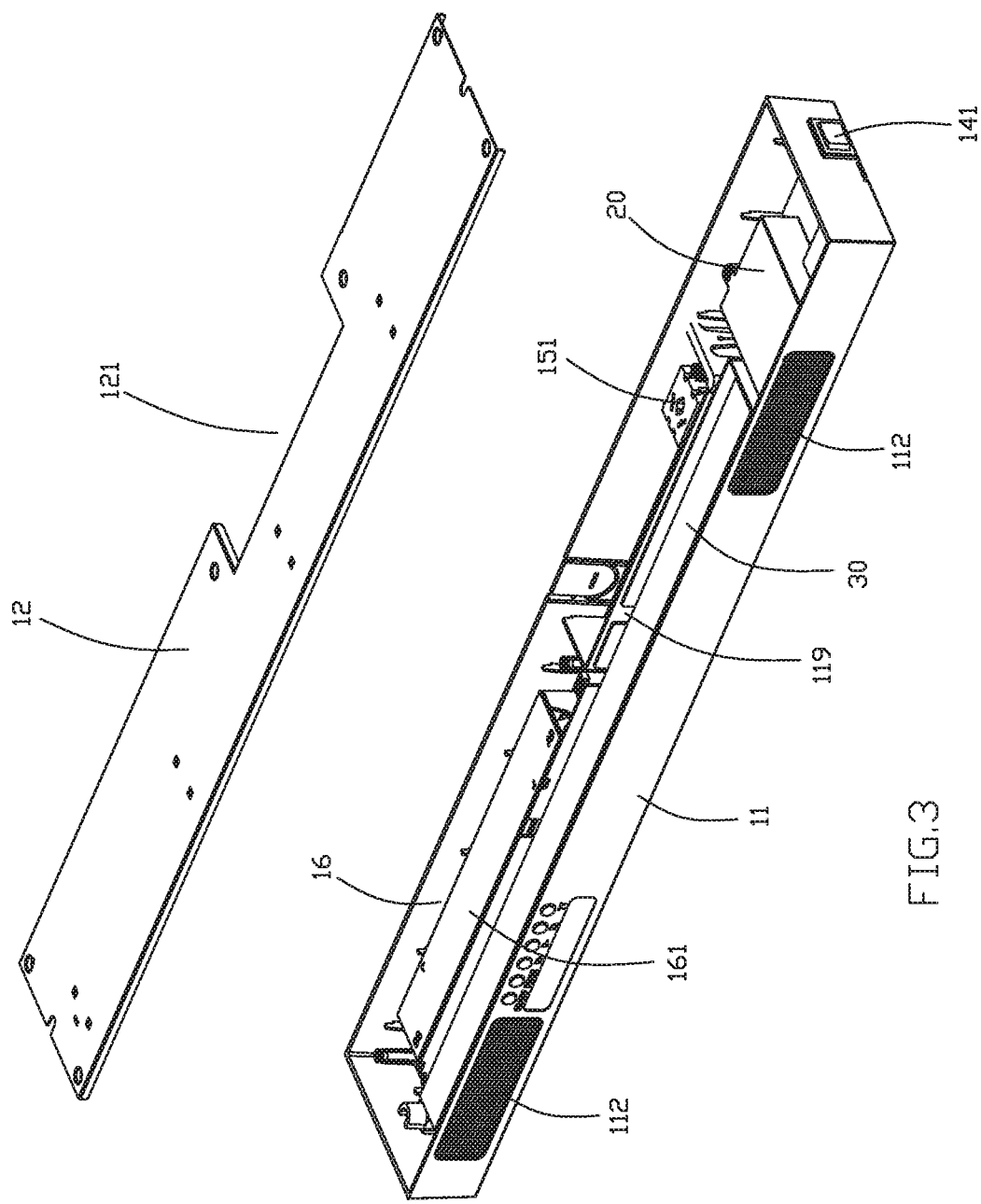
FIG. 3 is a partial exploded perspective view of the sound lamp in accordance with the preferred embodiment of the present invention.
Figure 4:
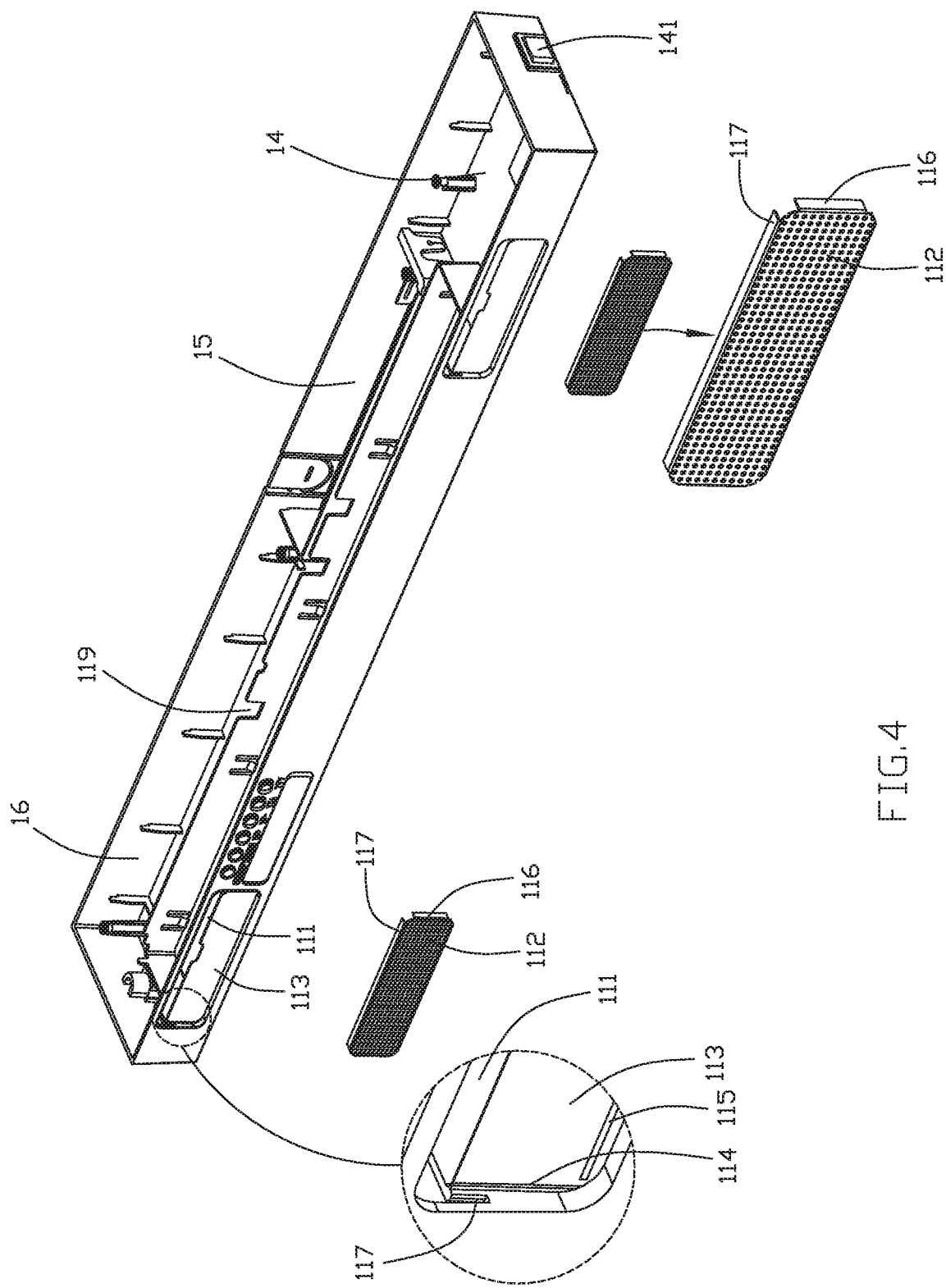
FIG. 4 is another partial exploded perspective view of the sound lamp in accordance with the preferred embodiment of the present invention.
Figure 5:
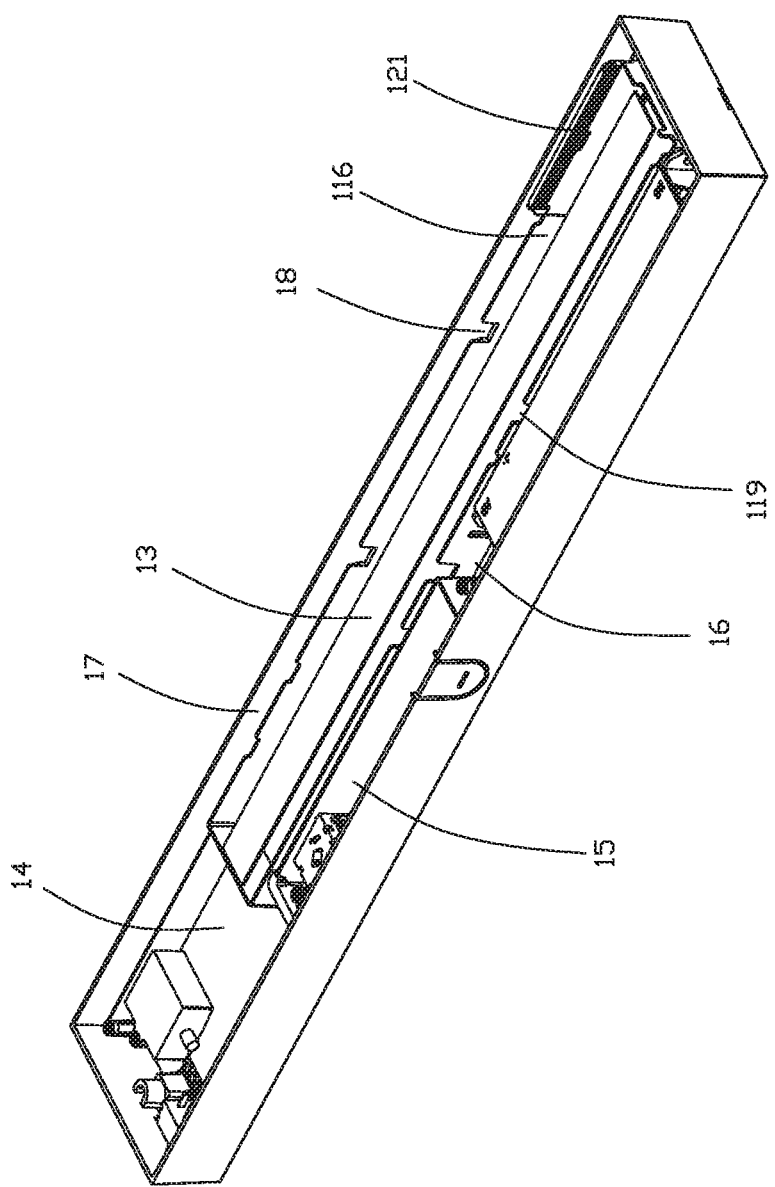
FIG. 5 is a partial perspective view of the sound lamp in accordance with the preferred embodiment of the present invention.

Referring to FIGS. 1-5, a sound lamp in accordance with the preferred embodiment of the present invention comprises a housing 10, an acoustics (or sound device) 20 mounted in the housing 10, and a lighting module 30 mounted in the housing 10.

The housing 10 includes a housing body 11 and a top cover 12 mounted on the housing body 11. A receiving space is defined between the housing body 11 and the top cover 12. The housing body 11 has a side provided with a plurality of sound output holes 111. The housing 10 further includes a plurality of sound output reticulate boards 112 mounted in the sound output holes 111, and a baffle 113 mounted in the housing body 11 and corresponding to the sound output holes 111. A guide channel 17 (see FIG. 5) is defined between the housing body 11 and the baffle 113, and is connected to the sound output reticulate boards 112 which connect the guide channel 17 to the ambient environment. Each of the sound output reticulate boards 112 has two mounting pieces 117 provided on a top and a bottom thereof. A lower one of the two mounting pieces 117 is secured to the baffle 113, and an upper one of the two mounting pieces 117 is spaced from the baffle 113.

The acoustics 20 is mounted in the receiving space of the housing 10.

The lighting module 30 is mounted in the receiving space of the housing 10. The lighting module 30 has a top flush with or lower than a top of the baffle 113.

In the preferred embodiment of the present invention, the baffle 113 is spaced from a periphery of each of the sound output holes 111. The baffle 113 is provided with a plurality of locking slits 114. The baffle 113 has a bottom provided with an elongate slot 115. Each of the sound output reticulate boards 112 has two locking pieces 116 locked in the locking slits 114 of the baffle 113 respectively. The lower one of the two mounting pieces 117 of each of the sound output reticulate boards 112 is inserted into the elongate slot 115 of the baffle 113. The upper one of the two mounting pieces 117 of each of the sound output reticulate boards 112 rests on the top of the baffle 113.

In the preferred embodiment of the present invention, the housing body 11 has a bottom provided with a light output board 118 corresponding to the lighting module 30 which emits light rays through the light output board 118. The light output board 118 is made of transparent material.

In the preferred embodiment of the present invention, the housing body 11 is provided with a lighting module chamber 13 and an acoustics chamber 14. The housing body 11 is provided with a plurality of connecting openings 119 connected between the lighting module chamber 13 and the acoustics chamber 14. The acoustics 20 is mounted in the acoustics chamber 14 of the housing 10 and emits sound outward from the sound output reticulate boards 112. The lighting module 30 is mounted in the lighting module chamber 13 of the housing 10.

In the preferred embodiment of the present invention, the lighting module 30 includes a support plate mounted in the lighting module chamber 13 of the housing 10, and a plurality of light emitting members mounted on a bottom of the support plate. The support plate of the lighting module 30 has a top flush with or lower than a top of the baffle 113, to reduce numbers of the light rays passing through the sound output reticulate boards 112. The support plate of the lighting module 30 is secured to the housing 10 by fasteners.

In the preferred embodiment of the present invention, the lighting module chamber 13 of the housing 10 has a wall provided with a plurality of connecting grooves 18 connected to the guide channel 17. The connecting grooves 18 is connected to the sound output reticulate boards 112, such that the heat produced by the lighting module 30 is introduced fast through the connecting grooves 18, the guide channel 17, and the sound output reticulate boards 112, to enhance the heat radiating effect of the lighting module 30.

In the preferred embodiment of the present invention, the housing 10 is provided with a switch 141 connected to the acoustics chamber 14. The switch 141 is electrically connected with an electric cord which is electrically connected with the acoustics 20. Thus, the switch 141 turns on/off the acoustics 20.

In the preferred embodiment of the present invention, the sound lamp further comprises a control terminal connected with the acoustics 20 and the lighting module 30. The control terminal controls operation of the acoustics 20, including on/off action, volume regulation, and audio switching of the acoustics 20. The control terminal controls operation of the lighting module 30, including on/off action and brightness regulation of the lighting module 30.

In the preferred embodiment of the present invention, the control terminal is an APP of a smart phone.

In the preferred embodiment of the present invention, the baffle 113 has a bottom connected with the inner edge of each of the sound output holes 111, and has a top spaced from the inner edge of each of the sound output holes 111.

In the preferred embodiment of the present invention, the housing body 11 is provided with a power supply chamber 15 for mounting a power supply 151 and a mounting chamber 16 for mounting a control device 161. The power supply 151 is an electric socket or receptacle. The top cover 12 is provided with a passage 121 corresponding to the power supply chamber 15 and the power supply 151, to allow passage of electric cords. The power supply 151 is electrically connected with the acoustics 20 and the control device 161, to provide an electric power to the acoustics 20 and the control device 161. The control device 161 is electrically connected with the lighting module 30 by an electric cord, controls operation of the lighting module 30, including on/off action and brightness regulation of the lighting module 30.

In the preferred embodiment of the present invention, the connecting openings 119 are connected between the lighting module chamber 13, the acoustics chamber 14, the power supply chamber 15, and the mounting chamber 16.

In the preferred embodiment of the present invention, the connecting openings 119, the connecting grooves 18, and the guide channel 17 form a heat radiating channel.

In the preferred embodiment of the present invention, the APP of the smart phone is connected with the acoustics 20 and the control device 161. Thus, the user uses the APP of the smart phone according to the practical requirement, to turn on/off and regulate the brightness of the lighting module 30. In addition, the user also uses the APP of the smart phone according to the practical requirement, to turn on/off and regulate the volume of the acoustics 20, and to switch the audio functions of the acoustics 20.

In the preferred embodiment of the present invention, the acoustics 20 is provided with a Bluetooth device which is connected with the APP of the smart phone, such that the audio signals in the smart phone are transmitted to and played by the acoustics 20.

Accordingly, the sound lamp is provided with the acoustics 20, such that the sound lamp has lighting and sounding functions simultaneously, to enhance the amusement. In addition, the sound of the acoustics 20 is transmitted from the sound output reticulate boards 112, to enhance the sound output effect. Further, the heat is dissipated from the sound output reticulate boards 112, such that the sound output reticulate boards 112 have a heat dissipation function, to enhance the heat radiating effect and increase the lifetime of the lighting module 30.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A sound lamp comprising:
a housing;
an acoustics mounted in the housing; and
a lighting module mounted in the housing;
wherein:
the housing includes a housing body and a top cover mounted on the housing body;
a receiving space is defined between the housing body and the top cover;
the housing body has a side provided with a plurality of sound output holes;
the housing further includes a plurality of sound output reticulate boards mounted in the sound output holes, and a baffle mounted in the housing body and corresponding to the sound output holes;
a guide channel is defined between the housing body and the baffle, and is connected to the sound output reticulate boards;
each of the sound output reticulate boards has two mounting pieces provided on a top and a bottom thereof;
a lower one of the two mounting pieces is secured to the baffle, and an upper one of the two mounting pieces is spaced from the baffle;
the acoustics is mounted in the receiving space of the housing;
the lighting module is mounted in the receiving space of the housing; and
the lighting module has a top flush with or lower than a top of the baffle.

2. The sound lamp of claim 1, wherein:
the baffle is spaced from a periphery of each of the sound output holes;
the baffle is provided with a plurality of locking slits;
the baffle has a bottom provided with an elongate slot;
each of the sound output reticulate boards has two locking pieces locked in the locking slits of the baffle respectively; and
the lower one of the two mounting pieces of each of the sound output reticulate boards is inserted into the elongate slot of the baffle.

3. The sound lamp of claim 1, wherein the housing body has a bottom provided with a light output board corresponding to the lighting module.

4. The sound lamp of claim 1, wherein:
the housing body is provided with a lighting module chamber and an acoustics chamber;

the housing body is provided with a plurality of connecting openings connected between the lighting module chamber and the acoustics chamber;

the acoustics is mounted in the acoustics chamber of the housing; and the lighting module is mounted in the lighting module chamber of the housing.

5. The sound lamp of claim 1, wherein:

the lighting module includes a support plate mounted in the lighting module chamber of the housing, and a plurality of light emitting members mounted on a bottom of the support plate; and the support plate of the lighting module has a top flush with or lower than a top of the baffle.

6. The sound lamp of claim 1, wherein:

the lighting module chamber of the housing has a wall provided with a plurality of connecting grooves connected to the guide channel; and the connecting grooves is connected to the sound output reticulate boards.

7. The sound lamp of claim 1, wherein:

the housing is provided with a switch connected to the acoustics chamber; and the switch is electrically connected with an electric cord which is electrically connected with the acoustics.

8. The sound lamp of claim 1, further comprising:

a control terminal connected with the acoustics and the lighting module;

wherein:

the control terminal controls operation of the acoustics; and the control terminal controls operation of the lighting module.

9. The sound lamp of claim 8, wherein the control terminal is an APP of a smart phone.

* * * * *